(12) United States Patent
Balan et al.

(10) Patent No.: US 8,880,045 B2
(45) Date of Patent: Nov. 4, 2014

(54) REAL-TIME DELIVERY OF CALLER INFORMATION ON 3G AND 4G DATA WITH INCOMING VOICE CALL

(75) Inventors: Bindu Balan, Basking Ridge, NJ (US); Desmond A. Jackbir, St. Albans, NY (US)

(73) Assignee: Cellco Partnership, Basking Ridge, NJ (US)

( * ) Notice: Subject to any disclaimer, the term of this patent is extended or adjusted under 35 U.S.C. 154(b) by 205 days.

(21) Appl. No.: 13/491,218

(22) Filed: Jun. 7, 2012

(65) Prior Publication Data
US 2013/0331073 A1    Dec. 12, 2013

(51) Int. Cl.
*H04M 3/42*    (2006.01)
(52) U.S. Cl.
USPC ......... 455/415; 455/418; 455/414.1; 455/567
(58) Field of Classification Search
USPC ................................ 455/415, 418, 414.1, 567
See application file for complete search history.

(56) References Cited

U.S. PATENT DOCUMENTS

2011/0028187 A1*  2/2011  Kelkka et al. ................. 455/567

OTHER PUBLICATIONS

"Enhanced Caller ID," <http://cequint.com/products>,© Cequint Inc., 2011, 2 pages.

\* cited by examiner

*Primary Examiner* — Manpreet Matharu

(57) ABSTRACT

Systems and techniques are provided for delivering image content and other caller-specific data in real-time with an incoming voice call for a mobile device configured to receive voice calls and data through separate channels of the mobile communication network. In response to receiving a call request from an originating device for a voice call to a recipient mobile device, it is determined whether a database in the mobile communication network includes a caller-specific image associated with a caller at an originating mobile device. When the database is determined to include the caller-specific image, the image is sent via a network data connection to the recipient mobile device for display as part of an incoming call notification at the device. The voice call from the originating mobile device is allowed to proceed to the recipient mobile device, only after the caller-specific image is sent to the recipient mobile device.

21 Claims, 5 Drawing Sheets ary from Feb 12, 2013 or later.

REAL-TIME DELIVERY OF CALLER INFORMATION ON 3G AND 4G DATA WITH INCOMING VOICE CALL

BACKGROUND

In recent years, use of mobile communications devices for voice telephone services, email or text messaging services and even multi-media services has become commonplace, among mobile professionals and throughout the more general consumer population. Mobile communication services provided through public cellular or PCS (personal communication service) type networks, particularly for voice telephone service, have become virtually ubiquitous across much of the world. The mobile communication services offered by a wireless carrier or operator of a mobile communication network to users or subscribers may include a caller identification (or caller ID) service. Such a caller ID service or feature generally involves the display of information identifying the specific caller that originated an incoming call received at the user's mobile device. Such caller-specific information typically includes the caller's name and/or the phone number of the caller. If the mobile device recognizes the caller ID as corresponding to, for example, one of the user's contacts in a contact list stored locally at the device, the mobile device may display a picture of the contact from the local data storage with the caller ID information.

Furthermore, many mobile service providers have been upgrading wireless networks to support packet-switched data communications services, which extend the common data communication capabilities of the wired domain to the wireless mobile domain. However, the transition of an existing communication infrastructure to support newer technologies may require a substantial investment of time and resources. As such, mobile communication networks must still rely on existing technology and any limitations associated with such technology to provide voice and data communication services to their subscribers. In a particular example, mobile communication networks based on Code Division Multiple Access (CDMA) cellular telecommunication standards generally do not support simultaneous voice and data communications for mobile devices on the networks. Thus, a challenge faced by operators of mobile communication networks based on CDMA technology is the delivery of a voice call to a user's cellular telephone with data in real-time. Although specialized mobile devices exist that are capable of operating simultaneously in two different modes for voice and data, respectively, the high rate of power consumption and cost of such devices may make them prohibitive or impractical for general mobile device users. Another option is to deliver the data portion of a message using Short Message Service (SMS) technology, which is supported by most cellular devices. However, the use of SMS may limit the amount or kind of data that can be delivered with an incoming voice call. Furthermore, using SMS for this purpose may reduce overall system performance and lead to poor user experience.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
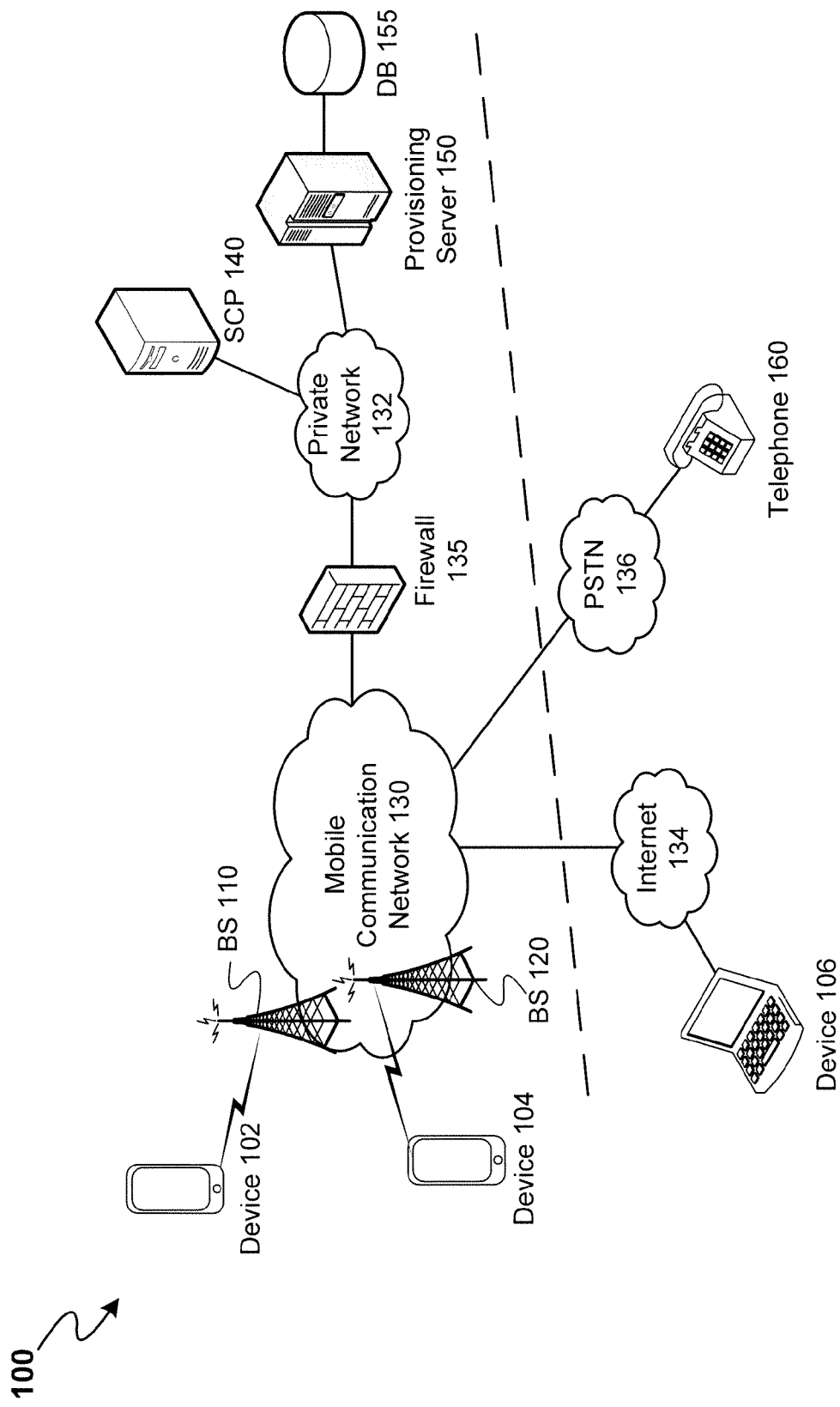
FIG. 1 illustrates an exemplary network environment for providing mobile voice telephone services and various data services across different communication networks.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The systems and techniques disclosed herein enable a wireless carrier or operator of a mobile communication network to provide image content and other caller-specific data together with an incoming call in real-time for a cellular mobile device configured to receive voice calls and data through separate channels of the mobile communication network. For example, the mobile communication network and/or mobile device may not provide a capability to provide simultaneous voice and data communications at a user's mobile device. As such, the techniques described herein may involve establishing a dedicated data path between the mobile communication network and the mobile device for delivering caller-specific information including, for example, an image of the caller (also referred to as the "calling party"), just prior to the display of an incoming call page or notification at the mobile device of the user who is the recipient of the call (also referred to as the "called party").

In an example, a client application program executable at a mobile device configures the device to display an incoming call screen or interface including an image associated with the caller and other caller-specific information, in response to a call received at the mobile device. The image may include, but is not limited to, a digital image captured by a digital imaging device (e.g., a digital camera) and/or computer-generated graphics content (e.g., a graphical icon). The image data associated with a caller may have been previously selected or provided by the caller to the mobile communication network. Additionally, the image data may be stored in association with other information related to a subscriber account for mobile services provided by the mobile communications network to the caller.

Further, the subscriber account for a caller may correspond to an individual user having one or more mobile devices or a business enterprise having numerous mobile devices, e.g., issued to different enterprise personnel. A benefit, particularly for enterprise subscribers, of the subject technology described herein is providing such an enterprise mobile subscriber with an option to send selected image content for display in real-time with incoming call notifications at recipient mobile devices (e.g., of actual or prospective enterprise customers). Further, the present techniques enable the enterprise to send enterprise-specific image content that is consistent for calls originating from any of the mobile devices associated with the enterprise subscriber account. Such enterprise-specific image content may include, for example and without limitation, a company logo, trademark or service mark of the enterprise organization. Additionally, such image content may include advertising information related to products or services provided by the enterprise. In an example, enterprise-wide notifications including a slogan or tagline for a product or service offered by the enterprise may be provided in real-time with an incoming call at a recipient's mobile device. In a further example, specialized content related enterprise personnel including, for example, an official title associated with an employee, may be provided with the incoming call.

The detailed description below uses a number of terms with respect to various system components and operations. Although generally known, use of several of these terms may not be strictly standardized in the art. For the convenience of the reader, the following definitions for some of the relevant terms are presented, as used by way of example in the detailed description below.

The terms "operator" and "carrier" are used herein interchangeably to refer broadly and inclusively to any provider or supplier of mobile network communication services, including services for the transmission of real-time voice and data communications for mobile device users/subscribers through a wireless or mobile communication network. An operator or carrier can be, for example and without limitation, a wireless service provider that provides various communication services to mobile phone subscribers. The services provided by the carrier may include, for example and without limitation, Voice-over Internet Protocol (VoIP) services for subscribers to use a personal computer or similar computing device to make and receive phone calls over Internet Protocol (IP) networks including the Internet or similar networks. As will be described in further detail below, services involving the communication of data may be provided by the wireless carrier/operator using a separate communication channel via a different type of radio access network (e.g., 3G or 4G data network) than the technology (e.g., One (1) times (x) Radio Transmission Technology or "1×RTT") and associated radio access network used for voice calls routed through the overall mobile communication network.

The term "client" is used herein to refer broadly to any process configured to consume a functionality of an application offered by an application server. For example, when a client uses an application, the client is generally utilizing at least one function of the service. Such a client may be executed at any type of computing device including, for example and without limitation, a desktop computer or workstation, a mobile device, or a host or network device that may operate at other times as a server to other clients. Such a server may be any type of computing device capable of communicating data to one or more clients over a communication network. Further, a client can be any type of remote or local process with respect to the computing device executing or hosting the service. Also, a client can be another application or service.

Reference now is made in detail to the examples illustrated in the accompanying drawings and discussed below. FIG. 1 illustrates a functional block diagram of an exemplary wireless network environment 100 for providing mobile voice telephone services and various data services across different communication networks. In the example illustrated in FIG. 1, network environment 100 includes a mobile communication network 130 that facilitates communications between various user devices 102, 104 and 106 and at least one server via different types of networks including, but not limited to, a private network 132 and the Internet 134, as will be described in further detail below. Mobile devices 102 and 104 each can be any type of mobile telecommunication device with at least one processor, a memory, a display and one or more user input devices (e.g., a touch-screen display, QWERTY keyboard or T9 keypad). Examples of such mobile telecommunication devices include, but are not limited to, portable handsets, smart-phones, tablet computers and personal digital assistants. Similarly, device 106 can be any type of desktop or personal computing device with at least one processor, a memory, a display, one or more user input devices and at least one network communication device for communications through one or more different types of networks (e.g., mobile communication network 130 via a wireless network card integrated with or coupled to device 106). While only devices 102, 104 and 106 are shown in FIG. 1, network environment 100 can be used to facilitate data communications for additional devices (not shown). Also, while not shown in FIG. 1, each network in network environment 100 includes intermediate network routers, gateways or servers between network components/devices.

For purposes of discussion, mobile communication network 130 will be described in the context of a network supporting both CDMA and 3rd Generation Partnership Project (3GPP) network technologies including, for example and without limitation, 3GPP type 2 (or 3GPP2) and 3GPP Long Term Evolution (LTE, at times also referred to as 4G). As described above, network 130 may use separate communication channels and radio access networks for communicating voice and data, respectively, to mobile devices 102 and 104. In an example, the radio access network for data communications is a 3G or 4G data network using 3GPP or 4G LTE technology and the radio access network for voice calls is a CDMA network using 1×RTT. However, it should be noted that the present techniques are not intended to be limited thereto and may be implemented using other types of mobile communication network technologies that do not provide simultaneous voice and data communications for mobile devices, as described above.

Mobile communication network 130 provides communications between mobile devices 102 and 104 as well as communications for other mobile devices on mobile communication network 130 and other devices outside of mobile communication network 130 (e.g., devices on third-party communication networks). An inter-carrier or other intermediate network gateway may provide communication connectivity between mobile communication network 130 and other networks. Mobile communication network 130 allows respective users of mobile devices 102 and 104 to initiate and receive telephone calls to each other as well as through the public switched telephone network (PSTN) 136 with one or more telephone stations 160 connected thereto. In an example, mobile communication network 130 offers a variety of text and other data services, including services via the Internet 134, such as downloads, web browsing, e-mail, etc. via various web servers (not shown) as well as message communications with terminal personal computing devices represented generally by device 106 personal computer.

In some implementations, mobile communication network 130 includes a number of interconnected access networks for providing voice and data communication services to mobile device subscribers/users. Hence, the overall network 130 may include a number of radio access networks (RANs), as well as regional ground networks interconnecting a number of RANs and a wide area network (WAN) interconnecting the regional ground networks to core network elements. A regional portion of network 130, such as that serving mobile devices 102 and 104 will typically include one or more RANs and a regional circuit and/or packet switched network and associated signaling network facilities. Physical elements of a RAN are generally operated by a mobile network operator or wireless carrier of mobile communication network 130. Such physical elements include a number of base stations, as represented in the example shown in FIG. 1 by a base station (BS) 110 and a base station 120.

Although not separately shown, each of base stations 110 and 120 may include a base transceiver system (BTS). A BTS communicates via an antennae system at the site of the respective base stations 110 and 120 via an over-the-air communication link with one or more mobile devices that are within a particular signal coverage range of the BTS. The BTS is the part of the radio network that sends and receives RF signals to/from mobile devices 102 and 104, as served by base stations 110 and 120, respectively. In this example, the BTS utilizes CDMA type transceiver equipment and implement communications in accord with the protocols of the applicable 3GPP2 standard, for signaling, registration, voice communication, data communication, etc. Thus, each of base stations 110 and 120 is configured to broadcast certain standardized information (e.g., in accordance with CDMA or LTE communication protocols) to mobile devices 102 and 104 in addition to other mobile devices (not shown) within range of the particular base station so as to enable each device to find and establish a communication link with the base station via mobile communication network 130.

The radio access networks of mobile communication network 130 also include a mobile traffic network for voice communications between each mobile device, base stations 110 and 120 and other network elements. Individual elements (e.g., switches, gateways and/or routers) forming the traffic network are omitted from FIG. 1 for ease of discussion. Although not separately shown, the mobile communication network 130 will include or communicate with a number of service control elements. Such service control elements may include, for example, elements for authenticating mobile devices 102 and 104 to access mobile communication network 130. Additionally, such elements may include authorization control elements for authorizing users or devices for accessing various communication services and features offered by network 130. Further, such elements may include a billing system for purposes of usage accounting and billing functions of network 130. Some of these authentication or authorization functions may require credentials information from the mobile devices or their respective users (e.g., on a periodic basis for security reasons).

The above-described traffic network portion of mobile communication network 130 connects to a public switched telephone network (PSTN) 136, as shown in FIG. 1. This allows the network 130 to provide connections for voice calls between mobile devices 102 and 104 and a conventional landline telephone 160 connected to PSTN 136. Although only telephone 160 is shown in FIG. 1, any number of telephones in various physical locations may be connected to PSTN 136. Further, the traffic network portion of mobile communication network 130 also connects to a public packet switched data communication network. Such a packet switched data network may include the World Wide Web or the Internet, shown at 134 in FIG. 1. Packet switched communications via the traffic network of network 130 and the Internet 134 may support a variety of user services for mobile device communications. Examples of such services may include, but are not limited to, text and multimedia messaging services, electronic mail ("e-mail"), web browsing, and the downloading of new application programs and online media content. For example, the mobile devices may be able to send and receive messages to and from a user terminal device, e.g., personal computing device 106, via a direct (e.g., peer-to-peer) connection or through various intermediate servers.

The carrier or service provider that operates mobile communication network 130 will also operate a number of systems that provide ancillary functions in support of the communications services provided through network 130. Network elements, as described above, may be configured to communicate with each other via a private network 132. In some implementations, private network 132 is an Internet Protocol (IP) based packet data network behind a firewall 135 or security layer that functions to maintain secure communications between the system components of the private network 132 by preventing unauthorized access by devices via other networks. In the example of FIG. 1, such system components include a service control point (SCP) 140 and a provisioning server 150 that are communicatively coupled to each other via private network 132. In addition, provisioning server 150 is coupled to a database 155. Database 155 may be used to store data to be processed and/or communicated by provisioning server 150. In some implementations, some of the network elements (e.g., SCP 140, provisioning server 150 and database 155) associated with the image delivery service functionality may be operated by a third-party service provider associated with the carrier, rather than by the carrier directly.

In an example, the data includes information related to different subscribers or users of mobile devices (e.g., including mobile devices 102 and 104) for purposes of accessing various data services provided by mobile communication network 130. Such subscriber data may include various records used for authentication and authorization functions and provisioning necessary information into the mobile devices to enable the devices to operate via mobile communication network 130. In some implementations, the subscriber data stored at database 155 includes an image data file provided by a subscriber or mobile device user for download provisioning into a recipient mobile device when a call is placed by the user's device to the recipient mobile device. For example, SCP 140 may be configured to communicate with mobile devices 102 and 104 via network 130 for various over-the-air provisioning functions.

In the above example, the functions of SCP 140 and provisioning server 150 may include, for example and without limitation, functions related to providing image data and other caller-specific information in real-time with incoming calls to mobile devices 102 or 104 via network 130. Such functions may further include providing devices 102 and 104 with executable programming, e.g., for credential management over time. As will be described in further detail below with respect to FIG. 2, SCP 140 may be used to invoke the functionality of the image delivery service described herein using various network components, e.g., based on triggers according to an Intelligent Network (IN) architecture. For example, SCP 140 may communicate with a packet gateway for delivering such caller-specific data to either mobile device 102 or mobile device 104 via a data pathway, link or wireless connection established between each device and mobile communication network 130. The caller-specific data is delivered such that the data is made available to a recipient device prior to an incoming call page or notification received at the recipient device. As such, SCP 140 may be configured to cause a request for a voice call from an originating device to be held at an originating switch within mobile communication network 130 for a predetermined period of time (e.g., as configured for the particular network 130), or at least until the SCP 140 receives an indication that the call-specific data has been delivered to the recipient mobile device. The data pathway may have been previously established based on a network address (e.g., an Internet Protocol (IP) address) associated with the particular mobile device. For example, the mobile communication network 130 may assign a network address (e.g., an Internet Protocol (IP) address) to each of mobile devices 102 and 104 when each device is powered on or comes within a service range of the mobile communication network 130.

In some implementations, a client application executed at each of mobile devices 102 and 104 configures each device to register its assigned network (or IP) address with SCP 140 or provisioning server 150. Accordingly, responsive to receiving a registration request from mobile device 102 or 104 (or client executable at each device) via the mobile communication network 130, SCP 140 or provisioning server 150 stores the registered network address of mobile device 102 or 104 in association with subscriber account information previously stored for the particular mobile device within database 155. The subscriber account information may be associated with a unique identifier associated with each mobile device. Examples of such a mobile device identifier may include, but are not limited to, a mobile device identifier is a Mobile Directory Number ("MDN"), a Mobile Equipment Identifier ("MEID") or a Mobile Identifier Number ("MIN"). Further, various network address translation (NAT) schemes may be used by SCP 140 or provisioning server 150 for data exchange purposes including, for example, a 1:1 or N:1 NAT binding between SCP 140 or provisioning server 150 and mobile devices 102 or 104 (e.g., via a data channel of mobile communication network 130).

Figure 2:
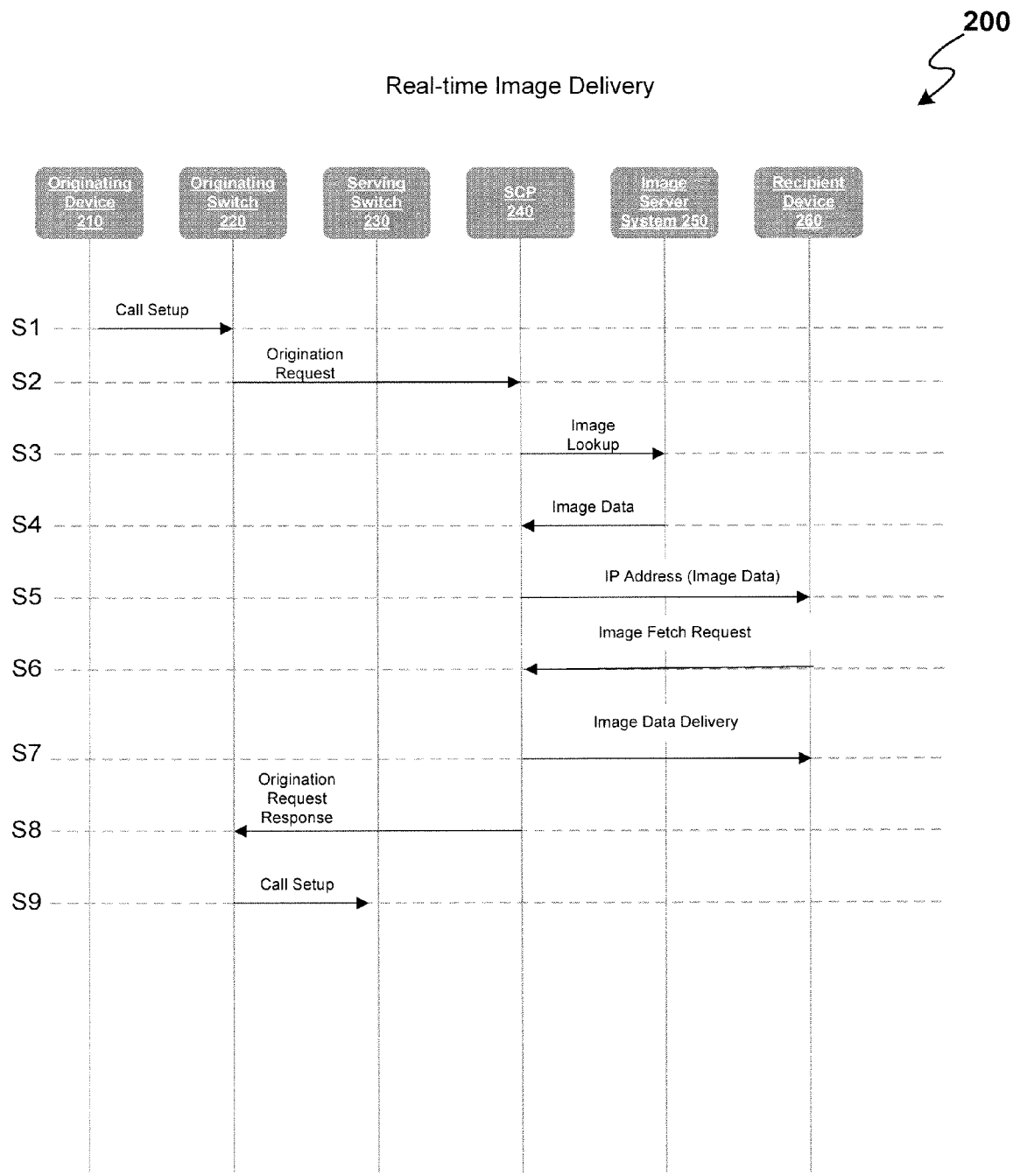
FIG. 2 is a flowchart of an exemplary process for providing image content and other caller-specific data with an incoming call in real-time for a cellular mobile device configured to receive voice calls and data through separate channels of a mobile communication network.

FIG. 2 is a flowchart of an exemplary process 200 for providing image content (e.g., the caller's picture) and other caller-specific data in real-time with an incoming call for a cellular mobile device (e.g., mobile device 102 or 104 of FIG. 1, as described above) configured to receive voice calls and data through separate radio access networks or channels of a mobile communication network (e.g., network 130 of FIG. 1, as described above). For purposes of discussion, process 200 will be described herein in the context of network environment 100, but process 200 is not intended to be limited thereto. As described above, the caller-specific data and voice may be delivered to such a recipient (or "terminating") mobile device as 3G or 4G data with 1×RTT voice. Further, the data may be provided by the mobile communication network via a dedicated data connection to the recipient mobile device.

In the example shown in FIG. 2, a caller places a call from an originating mobile device 210 (e.g., mobile device 102 of FIG. 1) to a recipient mobile device 260 (e.g., mobile device 104 of FIG. 1) via the above-described mobile communication network (e.g., network 130). The mobile communication network in this example includes various network elements for delivering voice and data communications related to the call. As shown in FIG. 2, such network elements include an originating switch 220, a serving switch 230, an SCP 240 (e.g., SCP 140 of FIG. 1) and an image server system 250 (e.g., provisioning server 150 and database 155 of FIG. 1). Although not shown in FIG. 2, it should be noted that the mobile communication network in this example may include additional network elements including, for example, additional gateways, routers or other network elements for providing 3G and 4G data services. Such additional network elements may include both packet switched nodes for data services in addition to circuit switched nodes network nodes for providing voice calls to subscribers' mobile devices via the mobile communication network. Further, although the steps of process 200 are described based on communications between only the various network elements shown in FIG. 2, it should be noted that the network elements of FIG. 2, as referenced in the discussion below, may invoke one or more of the above-described additional network elements that are not shown in FIG. 2. For example, SCP 240 may invoke a packet gateway (PGW) or one or more servers or other type of gateway or router to send image and/or other caller-specific data to recipient mobile device 260, as will be described in further detail below. Thus, the image may be sent from SCP 240 to the gateway to recipient mobile device 260.

While originating device 210 is described as a mobile device (e.g., mobile handset) in this example, it should be noted that the present techniques are not intended to be limited thereto and that originating device 210 may be implemented using any type of personal computing device (e.g., device 106 of FIG. 1) capable of initiating voice calls and sending voice transmissions over a network (e.g., Internet 134) to a recipient mobile device capable of receiving such voice transmissions and other caller-specific data, as described herein. Such personal computing devices may include, but are not limited to, a personal desktop, laptop or notebook computer with a network communication card or device (including a wireless network expansion card for wireless broadband data services through a mobile communication network).

The recipient mobile device 260 of FIG. 2 is configured to communicate with the image server system 250 so as to register the device's 260 network address (e.g., IP address) with server system 250. In some implementations, this is accomplished by a client application program executable at recipient device 260. Such a client application may be a pre-loaded application or service installed by, for example, the device manufacturer or the mobile service provider or operator of the mobile communication network.

Server system 250 is configured to authenticate and register recipient mobile device 260 based on the communication received from mobile device 260. Once recipient mobile device 260 (or client) is successfully authenticated and registered by server system 250, a data path or connection is established for the exchange of data between server system 250 and the recipient mobile device 260. The established data path may be, for example, a radio frequency (RF) link for over-the-air communications between the system 250 and device 260 via the mobile communication network. In some implementations, the RF link remains dormant and is placed in active state only when data needs to be exchanged between device 260 and system 250 (or other network components), e.g., to reduce any unnecessary power consumption due to the RF link. The data being exchanged may be in the form of IP data packets based on any of various network data transport protocols (e.g., User Datagram Transport or "UDP"). The established data path is a dedicated data path. However, this data path may be of temporary duration based on, for example, a predetermined or expiration default time period of the mobile communication network for established data connections that are currently in an idle state or not in active use. Thus, mobile device 260 (or client executable at device 260) may be configured to ping server system 250 periodically at regular time intervals such that any established data connection/path remains active for an extended period of time, e.g., past any default expiration time period. As will be described in further detail below with respect to steps S1-S9 of process 200 of FIG. 2, the active data connection or pathway between system 250 and recipient device 260 can then be used to provide caller-specific image and other data to device 260 (e.g., via the client program executable at the device) to be available for display in real-time with a notification of an incoming voice call from the caller/subscriber at originating device 210.

When a subscriber using device 210 originates a voice call (S1), the call is received at originating switch 220 for purposes of call setup in the mobile communication network. In this example, it is assumed that originating device 210 and recipient device 260 are both associated with subscribers of mobile communication services of the same mobile communication network (e.g., network 130 of FIG. 1, as described above). However, it should be noted that the present techniques are not intended to be limited thereto, and thus, may be applied for calls originating from a mobile device (or even other type of computing device) on one communication network to a recipient mobile device (capable of receiving the caller-specific image and other data as described herein) on a different communication network (e.g., of a different wireless carrier).

Referring back to the example network environment 100 of FIG. 1, as described above, originating switch 220 and serving switch 230 may be implemented using any of the various intermediate switches, routers, gateways or network access points of mobile communication network 130 through which circuit-switched data (e.g., 1×RTT voice) in addition to packet-switched data (e.g., 3G or 4G data) are routed. For example, originating switch 220 may be a mobile switching center (MSC) associated with a base station (e.g., base station 110 of FIG. 1) of the mobile communication network for routing voice calls and SMS and other services (e.g., involving circuit-switched data communications) from originating device 210 (e.g., mobile device 102 of FIG. 1) to recipient mobile device 260 (e.g., mobile device 104 of FIG. 1). The MSC in this example may be coupled to a home location register (HLR) for connecting to mobile devices registered to subscribers on the mobile communication network and a visitor location register (VLR) for devices that may be roaming from a mobile communication network associated with a different wireless carrier.

In the example illustrated in FIG. 2, the call setup (S1) from originating device 210 includes the mobile device number (MDN) corresponding to the recipient device 260, as entered or dialed by the caller at device 210. The call setup may also include information identifying the originating device 210 within the mobile communication network. Such information may include, for example, the MDN or other unique device identifier associated with device 210. The originating switch 220 routes the relevant call setup information to SCP 240, for example, by including this information within a call origination request (S2) sent to SCP 240, as shown in FIG. 2. SCP 240 may use this information to validate or verify the subscription status of both parties. For example, the real-time delivery of caller data and voice as described herein is provided to mobile device users or subscribers of general mobile communication services as an optional subscription-based service by the mobile communication network provider. Further, an override option to disable the image delivery feature may be provided to each individual user having a mobile device that is one of multiple mobile devices associated with a single subscriber account, e.g., as in the above-described enterprise context. In an example, an enterprise user may invoke such an override option directly from the user's enterprise-issued mobile device (or other type of device associated with a subscriber account of the enterprise), e.g., via a client application or other interface provided at the device. The enterprise user in this example is thus allowed to control whether or not the user's picture is provided to receiving parties for voice calls originating from the enterprise-issued mobile device. In a further example, the enterprise may specify particular image content (e.g., enterprise logo) to be provided by default for all calls originating from mobile devices associated with a subscriber account of the enterprise. As such, while the enterprise user in the prior example may have the option of controlling whether or not the user's personal image is provided to recipient mobile devices for voice calls initiated by the user using a device associated with the enterprise, this user may not have any control over whether or not the default image (e.g., enterprise logo) is provided to recipient mobile devices for such calls.

The originating call is held at the SCP 240, while caller-specific information including image data associated with the subscriber at originating device 210 is acquired from image server system 250 (S3 and S4). In addition to the image data, SCP 240 may be configured to retrieve additional caller-specific information, for example, from a database (e.g., database 155 of FIG. 1) of image server system 250 or other backend systems or devices of the mobile communication network. Examples of additional caller-specific information that may be retrieved include, but are not limited to, the caller's name and location (e.g., city and state). In some implementations, some of this additional caller-specific information (e.g., city and state) may be stored locally in a local data store or internal memory of the recipient device 260 and is retrieved by device 260 (or client executable at device 260) for display with the incoming call notification. As described above, additional information that may be retrieved for the incoming call notification may also include a Friends and Family ("FnF") indicator displayed, for example, when the MDN of the recipient mobile device 260 (as dialed by the caller at originating device 210) is determined to be included within a Friends and Family list associated with the caller, as will be described below with respect FIG. 3. Also, as described further below, the incoming call notification may include a Mobile to Mobile ("M2M") indicator displayed, for example, when it is determined that the MDN of the originating device 210 and the MDN of the recipient device 260 are associated with the same wireless carrier or mobile communication service provider. Further, such caller-specific information may be stored in association with information for a subscriber account. The subscriber account may be associated with the particular originating device 210 and may be identified within the mobile communications network according to the MDN assigned to originating device 210.

As described above, a dedicated wireless data connection or link may have been previously established between recipient device 260 and either of server system 250 or device 260, depending on the particular implementation used for the mobile communication network. Further, this established data link may be maintained in an active state, e.g., based on active signals sent periodically from recipient device 260 to SCP 240 or server system 250 for this purpose. SCP 240 (or server system 250) invokes the previously established data connection to push data to recipient device 260 (or the client executable at device 260). In some implementations, SCP 240 queries image server system 250 for caller-specific data associated with a subscriber account linked to the MDN corresponding to originating device 210. This may include determining whether the queried data includes image data associated with the subscriber account (S3). If there is image data associated with the subscriber account, the image data is retrieved by SCP 240 from the image database (e.g., database 155, of FIG. 1) of image server system 250 (S4). The retrieved image data may have its own network address (e.g., IP address) associated with it, which SCP 240 then sends to recipient device 260 (S5). The stored image data may include an IP address corresponding to the location of the stored image data, e.g., as previously assigned when the data was initially stored in association with subscriber account information. Thus, the image data may remain in the database and SCP 240 may be configured to retrieve only the IP address information for the image data for purposes of routing to recipient device 260. Upon receiving the IP address associated with the image data, recipient device 260 (or client executable thereon) may be configured to send a fetch request for the image data based on the IP address (S6).

Upon receiving, from the recipient mobile device 260 via the established data connection, the fetch request including the transmitted network address associated with the retrieved caller-specific image content, SCP 240 sends the caller-specific image content to the recipient mobile device 260 via the established data connection (S7). Prior to sending the requested image data, SCP 240 may first determine whether the recipient device 260 is a device capable of receiving the image and other caller-specific data. For example, SCP 240 may make such a determination based on information identifying the specific type of device 260 that may be acquired, e.g., from stored subscriber account information associated with the device or from the device 260 itself via a wireless data link to the device. Examples of such device-specific information may include, but are not limited to, device manufacture, hardware version number, the type and version number of the operating system software installed at the device and description of the networking capabilities of the device (e.g., whether the device supports 3G or 4G data). Thus, SCP 240 may send the caller data only when it has determined recipient device 260 to be an eligible device capable of receiving the caller data for display to the user. In some implementations, the fetch request and image data are delivered in the form of Hyper Transport Transfer Protocol (HTTP) messages. However, it should be noted that the present techniques are not limited thereto and that the requests and data may be transmitted through the data connection using any of various communication protocols used for data transport.

In some embodiments, to prevent any extended disruption to completion of the voice call, originating switch 220 may be configured to hold the call until a predetermined condition is met. This condition may be the reception of a response from SCP 240 or, if no response has been received from SCP 240, a predetermined amount of time has elapsed. Thus, originating switch 220 may be configured to hold the call for at most only a predetermined period of time (e.g., whether or not a response is received from SCP 240)—in one embodiment until the earlier of the two occurs. In some implementations, SCP 240 may also be configured to send a success response indicating that image data was sent or an automatic or default response after another predetermined time period has elapsed to originating switch 220, which causes switch 220 to release the call. The success response and automatic/default response may be different to allow SCP 240 to provide success/failure information to originating device 210 (and/or an element in the network), or the responses may be the same so that any communication from SCP 240 to originating switch 220 after the request from originating switch 220 triggers originating switch 220 to release the call.

In some implementations, the predetermined time period used by SCP 240 may be of a shorter duration than that of originating switch 220, and thus, the time period for switch 220 may be used only if SCP 240 fails to send the automatic release response before the expiration of the holding time period used by switch 220. In addition, there may be a limited number of attempts (e.g., only one attempt) to retrieve the caller-specific image data in order to minimize the wait time for the voice call. As above, once SCP 240 receives an indication that the image data is delivered to or has been received by the recipient device 260 (S7) or the predetermined time period at the SCP 240 expires, SCP 240 sends a response to the originating switch 220 (S8). In some implementations, SCP 240 may invoke image server system 250 to send the image data to recipient mobile device 260, in which case the indication received by SCP 240 may be sent from either image server system 250 (e.g., once the image data is sent) or from device 260 (e.g., once the image data is received). In the either case, as above, upon receiving the response message from SCP 240, originating switch 220 then releases the call setup request to the serving switch 230 (the relevant call setup information is thus provided to SCP 240 first, rather than immediately being provided to serving switch 230), thereby allowing the voice call from originating device 210 to complete (S9). In this way, the call is held at the originating switch 220 by SCP 240 until the SCP 240 delivers the image data (if any) to recipient mobile device 260. In other words, when caller-specific image content is sent to the recipient mobile device, the voice call from the originating device 210 to the recipient device 260 through the mobile communication network is established only after the caller-specific image content is sent to the recipient mobile device.

When the serving switch 230 completes the call with recipient device 260, the recipient device 260 receives a call page or notification for the incoming phone call from originating device 210. In response to the incoming call page including the caller-specific image and other data, recipient device 260 displays an incoming call screen including the caller-specific data for the user at device 260. In some implementations, an application client installed and executable at recipient device 260, as described above, is invoked with the caller data in response to the incoming call notification or page so as to present the incoming call display screen to the user. The image data and other caller information may be retrieved by SCP 240 and cached for subsequent calls from the same caller or originating device 210 to the same recipient device 260, unless it was updated by the caller prior to the call. In an example, this data may be cached for an indefinite period of time, unless or until SCP 240 receives an indication (e.g., from image server system 250) that the information has been updated by the caller at some point prior to a subsequent voice call. In a different example, the data is cached for only a temporary time period (e.g., only for one or more subsequent calls placed within an hour or day of the initial call), as predetermined by the mobile communication service provider. This approach optimizes the use of data for every call.

Figure 3:
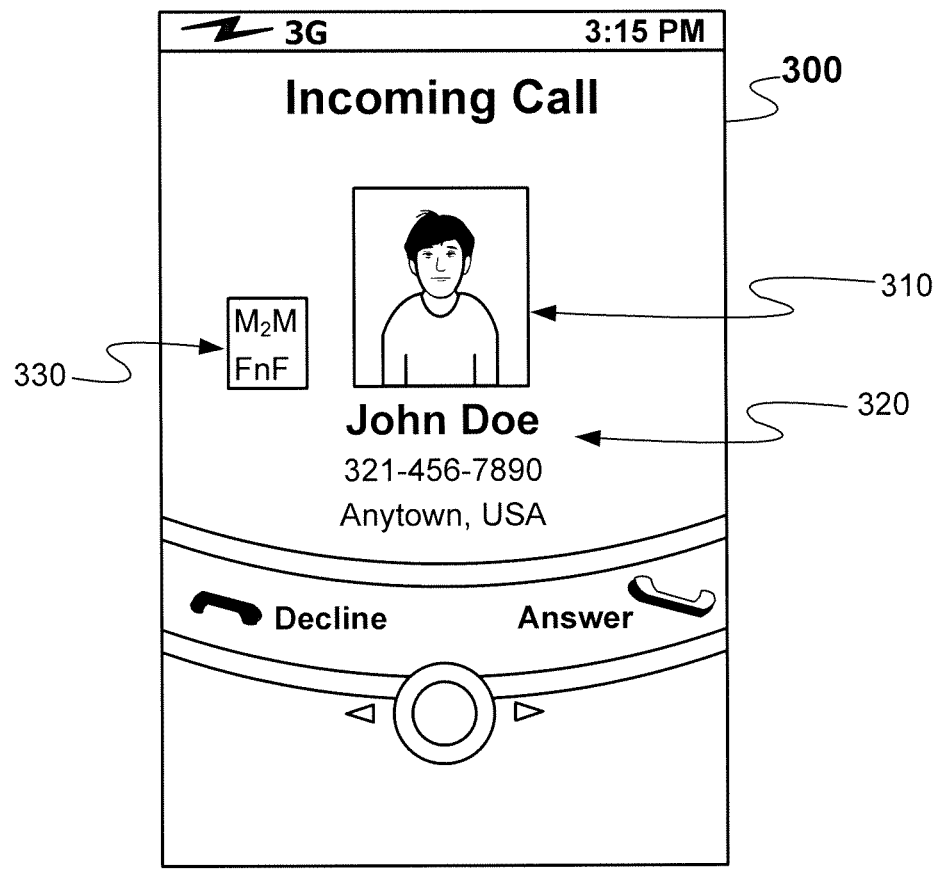
FIG. 3 is an example incoming call notification screen displaying received image content and other information identifying a caller for an incoming voice call at the mobile device of FIG. 2.

FIG. 3 illustrates an example of such an incoming call notification screen that may be displayed at the recipient mobile device 260 of FIG. 2. As shown in FIG. 3, an incoming call screen 300 includes various user controls for either answering or declining the incoming call along with an image 310 of the caller and other caller-specific information 320 including, for example and without limitation, the caller's name, phone number (e.g., MDN associated with originating device 210 of FIG. 2) and geographic location information (e.g., city and state) associated with the caller. In some implementations, as part of the above-described "picture caller-ID"

service, the subscriber at the recipient mobile device receives a Mobile to Mobile ("M2M") and/or Friends and Family ("FnF") indicator 330, when the incoming call is originating from a mobile device on the same mobile communication network (operated by the same wireless carrier) and/or from a device associated with a friend or family member of the subscriber, respectively. For example, a friend and family member list may be stored along with the above-described information for each subscriber account. This list may include, for example, the MDN of each subscriber's mobile device, and thus, can be used to determine whether the originating and recipient devices are associated with each other via such a friend and/or family list. It should be noted that the M2M and FnF indicator(s) 330, as shown in FIG. 3, is provided as an example and the present techniques are not intended to be limited thereto. Thus, indicator 330 may be used to display other types of information including, for example and without limitation, information (e.g., advertisements or brands) related to products or services provided by the caller or subscriber account associated with the caller.

In some implementations, various lists of friends or family members may be associated with a public profile of a subscriber within a third-party social networking site. In an example, the mobile communication network may include a service capable of retrieving information associated with the subscriber's public profile from the social networking site. The information may be used, for example, to populate the caller's picture on the incoming call display screen 300, as described above. As this may or may not be picture the caller wishes to share for calls made to business clients, for example, the service may further allow the caller/subscriber to upload different image content as to display a custom image based on the recipient of each call. For example, the image content may include a graphical icon or logo (e.g., a Company logo) to be displayed for calls made to clients or customers of the caller. In some implementations, a subscriber may assign a priority or further specify which of a plurality of images should be selected and delivered for a voice call to the recipient mobile device. For example, an enterprise subscriber may assign a default priority to an enterprise logo or specify the logo is always provided for each voice call, but the personal image of the particular caller (e.g., employee associated with the particular mobile device associated with the enterprise account) may be provided only if available before the call to the recipient mobile device is allowed to complete (e.g., within a predetermined time period, as described above). Thus, an advantage of the present techniques as described herein is providing significant brand value to enterprise subscribers by enabling such subscribers to display their respective organization's trademark or logo, for example, when making outgoing calls from mobile devices associated with an enterprise account.

Figure 4:
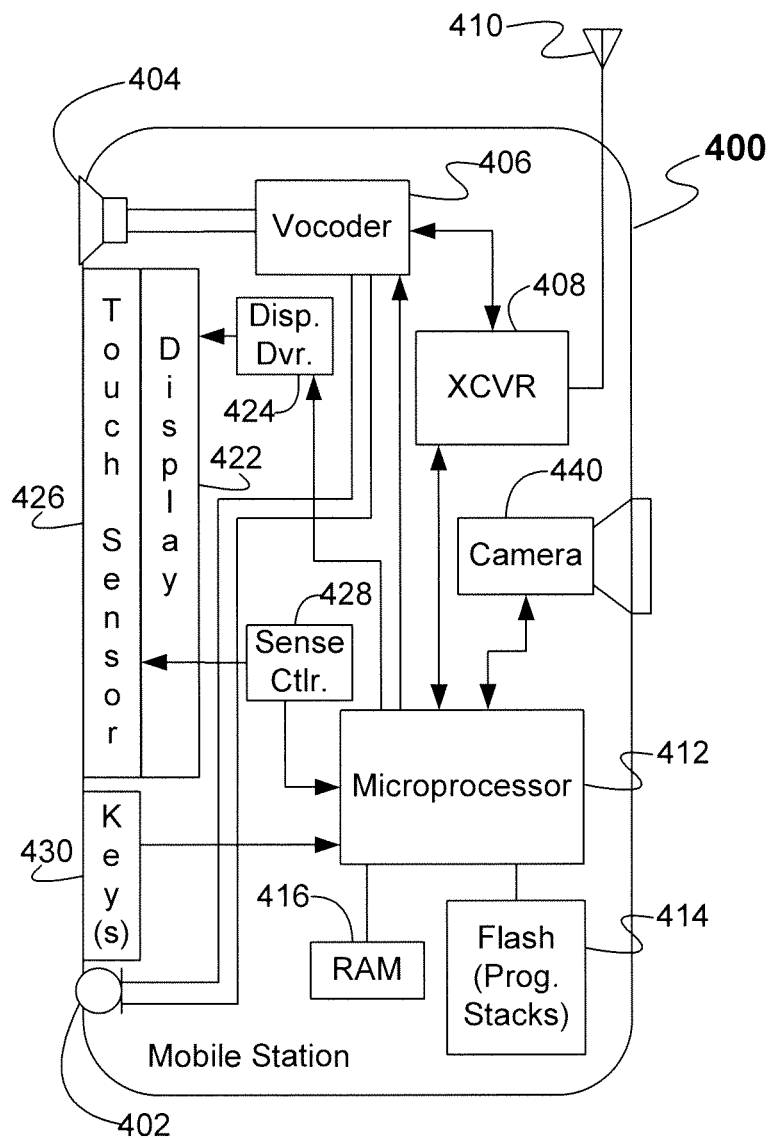
FIG. 4 is a high-level functional block diagram of an example mobile device.

FIG. 4 is a high-level functional block diagram of an example mobile device 400 for practicing an embodiment of the subject technology. In the example of FIG. 4, mobile device 400 is in the form of a mobile handset including a touch-screen display. Examples of touch-screen type mobile devices that may be used to implement mobile device 400 may include, but are not limited to, a smart phone device or tablet computer. However, the structure and operation of the touch-screen type mobile device 400, as will be described in further detail below, is provided by way of example, and the subject technology as described herein is not intended to be limited thereto. It should be appreciated that the disclosed subject matter may be implemented using a non-touch screen type mobile or portable device having communication and data processing capabilities, including capabilities to receive and display caller-specific information including image data associated with the caller at the device. Examples of such mobile devices may include, but are not limited to, net-book computers, tablets, notebook computers and the like. For example, the relevant functional elements/aspects of mobile devices 102 and 104 of FIG. 1, as described above, may be implemented using the example mobile device 400 illustrated in FIG. 4.

For purposes of discussion, FIG. 4 provides a block diagram illustration of an exemplary mobile device 400 having a touch-screen user interface. As such, mobile device 400 can be any smart mobile device (e.g., smart-phone or tablet device). Although possible configured somewhat differently, at least logically, a number of the elements of the exemplary touch-screen type mobile device 400 are similar to the elements of mobile device 400, and are identified by like reference numbers in FIG. 4. For example, the touch-screen type mobile device 400 includes a microphone 402, speaker 404 and vocoder 406, for audio input and output functions, much like in the earlier example. The mobile device 400 also includes at least one digital transceiver (XCVR) 408, for digital wireless communications, although the mobile device 400 may include an additional digital or analog transceiver. The concepts discussed here encompass embodiments of the mobile device 400 utilizing any digital transceivers that conform to current or future developed digital wireless communication standards. As in mobile device 400, the transceiver 408 provides two-way wireless communication of information, such as vocoded speech samples and/or digital information, in accordance with the technology of a network, as described above. The transceiver 408 also sends and receives a variety of signaling messages in support of the various voice and data services provided via the mobile device 400 and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

As in the example of mobile device 400, a microprocessor 412 serves as a programmable controller for the mobile device 400, in that it controls all operations of the mobile device 400 in accord with programming that it executes, for all general operations, and for operations involved in the procedure for obtaining operator identifier information under consideration here. Mobile device 400 includes flash type program memory 414, for storage of various program routines and mobile configuration settings. The mobile device 400 may also include a non-volatile random access memory (RAM) 416 for a working data processing memory. Of course, other storage devices or configurations may be added to or substituted for those in the example. Hence, as outlined above, the mobile device 400 includes a processor, and programming stored in the flash memory 414 configures the processor so that the mobile device is capable of performing various desired functions, including in this case the functions associated with a client application executing on the mobile device, involved in the techniques for providing advanced data services by the carrier.

In the example shown in FIG. 4, the user input elements for mobile device 400 include a touch-screen display 422 (also referred to herein as "display screen 422" or simply, "display 422") and a keypad including one or more hardware keys 430. For example, the keypad may be implemented as a sliding keyboard of mobile device 400 and keys 430 may correspond to the keys of such a keyboard. Alternatively, the hardware keys 430 (including keyboard) of mobile device 400 may be replaced by soft keys presented in an appropriate arrangement on the touch-screen display 422. The soft keys presented on the touch-screen display 422 may operate similarly to hardware keys and thus, can be used to invoke the same user interface functions as with the hardware keys.

In general, the touch-screen display 422 of mobile device 400 is used to present information (e.g., text, video, graphics or other content) to the user of the mobile device. Touch-screen display 422 may be, for example and without limitation, a capacitive touch-screen display. In operation, touch-screen display 422 includes a touch/position sensor 426 for detecting the occurrence and relative location of user input with respect to the viewable area of the display screen. The user input may be an actual touch of the display device with the user's finger, stylus or similar type of peripheral device used for user input with a touch-screen. Use of such a touch-screen display as part of the user interface enables a user to interact directly with the information presented on the display.

Accordingly, microprocessor 412 controls display 422 via a display driver 424, to present visible outputs to the device user. The touch sensor 426 is relatively transparent, so that the user may view the information presented on the display 422. Mobile device 400 may also include a sense circuit 228 for sensing signals from elements of the touch/position sensor 426 and detects occurrence and position of each touch of the screen formed by the display 422 and sensor 426. The sense circuit 428 provides touch position information to the microprocessor 412, which can correlate that information to the information currently displayed via the display 422, to determine the nature of user input via the screen. The display 422 and touch sensor 426 (and possibly one or more keys 430, if included) are the physical elements providing the textual and graphical user interface for the mobile device 400. The microphone 402 and speaker 404 may be used as additional user interface elements, for audio input and output, including with respect to some functions related to the automated picture caller-ID feature for incoming voice calls, as described herein.

In the illustrated example of FIG. 4, the mobile device 400 also includes a digital camera 440, for capturing still images and/or video clips. Although digital camera 440 is shown as an integrated camera of mobile device 400, it should be noted that digital camera 440 may be implemented using an external camera device communicatively coupled to mobile device 400. The user may, for example, operate one or more keys 430 or provide input via touch sensor 426 (e.g., via a soft key displayed via the touch-screen display 422) to take a still image, which essentially activates the camera 440 to create a digital representation of an optical image visible to the image sensor through the lens of the camera. For example, the image may be of the subscriber or user associated with mobile device 400, as described previously. The camera 440 supplies the digital representation of the image to the microprocessor 412, which stores the representation as an image file in one of the device memories. The microprocessor 412 may also process the image file to generate a visible image output as a presentation to the user on the display 422, when the user takes the picture or at a later time when the user recalls the picture from device memory. Video images could be similarly processed and displayed. An audio file or the audio associated with a video clip could be decoded by the microprocessor 412 or the vocoder 406, for output to the user as an audible signal via the speaker 404.

As shown by the above discussion, functions relating to automatically retrieving caller-specific image data and displaying an incoming call screen in response to an incoming call notification may be implemented on a mobile device of a user, as shown by user devices 104, 260 and 400 of FIGS. 1, 2 and 4, respectively. However, it should be noted that such functions are not limited thereto and that such functions also may be implemented using any general-purpose computing device including, for example and without limitation, a personal desktop computer or workstation device communicatively coupled to a camera or other image capturing device for capturing digital images.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, as described herein. The software code is executable by the general-purpose computer. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for invoking the display of an incoming call screen (e.g., incoming call screen 300 of FIG. 3, as described above) including a caller's image and other identification information for an incoming voice call, in essentially the manner performed in the implementations discussed and illustrated herein.

Figure 5:
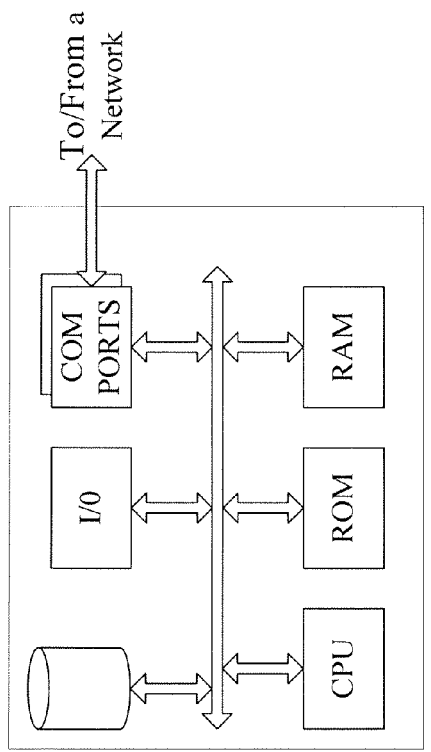
FIG. 5 is a simplified functional block diagram of an example computer that may be configured as a host or server in the network environment of FIG. 1.
Figure 6:
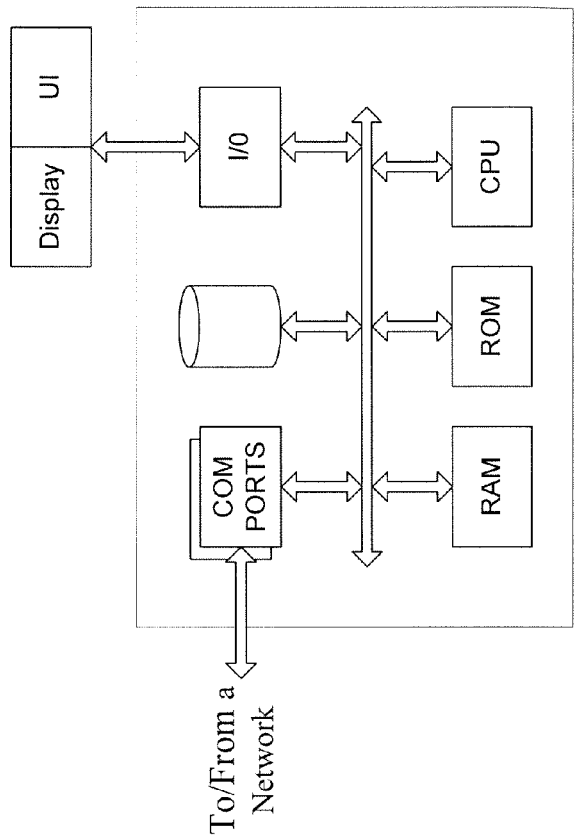
FIG. 6 is a simplified functional block diagram of an example personal computer or other work station or terminal device in the network environment of FIG. 1.

FIGS. 5 and 6 provide functional block diagram illustrations of general purpose computer hardware platforms. FIG. 5 illustrates a network or host computer platform, as may typically be used to implement a server (e.g., SCP 140 or server 150 of FIG. 1 and SCP 240 or portions of image server system 250, as described above). FIG. 6 depicts a computer or workstation device with user interface elements, as may be used to implement a personal computer (e.g., device 106 of FIG. 1, as described above). It is believed that the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the various network components of the mobile communication networks of FIG. 1 (e.g., SCP 140 or provisioning server 150) and FIG. 2 (e.g., SCP 240 or image server system 250), as described above, may be embodied in programming. Program aspects of the technology may be thought of as "products" or "articles of manufacture" typically in the form of executable code or process instructions and/or associated data that is stored on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a web application/service provider into the computer platform of the application or web server that will be hosting the web application/service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer" or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functions performed by the various network components of FIG. 1 and FIG. 2, as described above. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the computer as illustrated in the example of FIG. 6 may be a mobile computer with user interface elements, as may be used to implement a laptop, tablet or notebook computer or the like. For example, such a device may include a touch-screen display for user input and output. Alternatively, the device may include a standard light emitting diode (LED) display and, for example, an alphanumeric keypad or T9 keyboard. It is believed that the structure, programming, and general operation of such computing equipment and as a result the drawing should be self-explanatory. As known in the data processing and communications arts, a mobile computer comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, WiFi, IrDA, Bluetooth, etc. The software functionalities involve programming, including executable code, associated stored data, and graphical user interface code for implementing a client application program at the mobile device. The software code is executable by the processor of the mobile computer. In operation, the code is stored within the mobile computer. At other times, however, the software may be stored at other locations and/or transported for loading into the appropriate mobile computer. Execution of such code by a processor of the mobile computer enables the mobile computer to implement the methodology for a client for displaying an incoming call screen including image data and other call-specific information in response to an incoming call notification or page, in essentially the manner performed in the implementation discussed and illustrated herein.

Further, the client can be implemented in a remote computer (or server) on a network. That is, a client device (e.g., mobile device) sends information (e.g., a request message) to the remote server for requesting access to a function of a web application hosted at the server; and the remote server processes the request based on the request received from the client and returns an appropriate response (e.g., including application data retrieved from a database) to the client over the network. In the example above, the client device operates as a client terminal and the remote computer as a server in a client-server network environment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1×RTT—One (1) times (×) Radio Transmission Technology
3GPP—Third (3rd) Generation Partnership Project
3GPP2—Third (3rd) Generation Partnership Project 2
ADPU—Application Protocol Data Unit
BS—Base Station
BTS—Base Transceiver System
CAT—Card Application Toolkit
CCAT—CDMA Card Application toolkit
CD—Compact Disk
CDMA—Code Division Multiple Access
CD-ROM—Compact Disk-Read Only Memory
CPU—Central Processing Unit
CSIM—CDMA Subscriber Identity Module
DVD—Digital Video Disk
DVD-ROM—Digital Video Disk-Read Only Memory
EEPROM—Electrically Erasable Programmable Read Only Memory
EF—Elementary File
EPROM—Erasable Programmable Read Only Memory
EVDO—1x/Evolution-Data Only
GSM—Global System for Mobile Communications
ICCID—Integrated Mobile Equipment Identity
ID—Identification
IMEI—International Mobile Equipment Identity
IMSI—International Mobile Subscriber Identity
IR—InfraRed
ISIM—IP Multimedia Services Identity Module
LTE—Long Term Evolution
MDN—Mobile Directory Number
MEID—Mobile Equipment Identifier
MF—Master File
MIN—Mobile Identification Number
OTAF—Over-The-Air Functionality
OTAPA—Over the Air Parameter Administration
OTASP—Over the Air Service Programming
PC—Personal Computer
PCS—Personal Communication Service
PDA—Personal Digital Assistant
PGW—Packet Gateway
PIN—Personal Identification Number
PRL—Preferred Roaming List
PROM—Programmable Read Only Memory
PSTN—Public Switched Telephone Network
RAM—Random Access Memory
RAN—Radio Access Network
RF—Radio Frequency
ROM—Read Only Memory
R-UIM—Removable-User Identity Module
SIM—Subscriber Identity Module
SMS—Short Message Service
SMS-PP—Short Message Service-Point to Point
UICC—Universal Integrated Circuit Card
UIM—User Identity Module
UMTS—Universal Mobile Telecommunications Systems
USAT—Universal SIM Application Toolkit
USIM—Universal Subscriber Identity Module
WAN—Wide Area Network
XCVR—Transceiver

What is claimed is:

1. A method comprising steps of:
receiving, at a mobile communication network device from an originating device of a caller, a call request for a voice call to a recipient mobile device through a mobile communication network, the call request including a mobile device identifier associated with the originating mobile device;
responsive to the received call request,
transmitting image data to the recipient mobile device via a data channel of the mobile communication network based on the mobile device identifier associated with the originating mobile device, wherein the image data being transmitted is to be displayed as part of an incoming call notification at the recipient mobile device, and the image data is at least one of:
a caller-specific image associated with the caller, or
a default image related to a subscriber account associated with the originating device in the mobile communication network; and
allowing the voice call from the originating device to proceed to the recipient mobile device via a voice channel of the mobile communication network, only after the image data is transmitted to the recipient mobile device or a predetermined time period has elapsed after the call request has been received.

2. The method of claim 1, wherein the caller-specific image is a digital image of the caller as captured by a digital camera.

3. The method of claim 1, wherein the subscriber account is associated with an enterprise, the originating device is issued by the enterprise to the caller and the default image is graphics content generated by a computer and related to the enterprise.

4. The method of claim 1, wherein the recipient mobile device is configured to receive voice calls and data through separate voice and data channels of the mobile communication network and the voice channel of the mobile communication network includes a first type of radio access network for voice calls and the data channel of the mobile communication network includes a second type of radio access network for data.

5. The method of claim 4, wherein the first type of radio access network is a circuit-switched network for mobile voice communications and the second type of radio access network is a packet-switched network for mobile data communications.

6. The method of claim 4, wherein the first type of radio access network is a Code Division Multiple Access ("CDMA") network and the second type of radio access network is a Long Term Evolution ("LTE") network.

7. The method of claim 1, further comprising:
responsive to receiving a registration request from the recipient mobile device via the mobile communication network, storing an Internet Protocol (IP) address of the recipient mobile device in association with subscriber account information previously stored for the recipient mobile device within the database;
establishing a network data pathway to the recipient mobile device based on the stored IP address of the recipient mobile device;
transmitting, to the recipient mobile device via the established network data pathway, a network address associated with either the caller-specific image or the default image, depending on a determination of whether or not the caller-specific image is stored in the database; and
upon receiving, from the recipient mobile device via the network data pathway, a fetch request including the transmitted network address, sending the caller-specific image or the default image corresponding to the network address,
wherein the storing and establishing steps are performed prior to the step of receiving the call request from the originating device.

8. The method of claim 7, further comprising:
maintaining the established network data pathway in an active state in response to signals periodically received from the recipient mobile device.

9. The method of claim 7, wherein:
the registration request includes the caller-specific image; and
the caller-specific image is stored in association with the subscriber account information for the recipient mobile device.

10. The method of claim 7, wherein:
the originating device is a mobile device; and
the determination of whether or not the caller-specific image is stored in the database comprises:
verifying stored subscriber account information associated with the originating device based on the mobile device identifier of the originating device; and determining whether the stored subscriber account information associated with the originating device includes the caller-specific image, wherein the network address of the caller-specific image is transmitted to the recipient mobile device, only when the subscriber account information for the originating device stored in the database is determined to include the caller-specific image.

11. The method of claim 10, wherein:
the call request from the originating device further includes a mobile device identifier of the originating device;
the stored subscriber account information for the originating device is determined to include a plurality of caller-specific images; and
the transmitting of image data to the recipient mobile device further comprises:
selecting one of the plurality of call-specific images for transmission to the recipient mobile device based on the mobile identifier associated with the recipient mobile device.

12. A server system comprising:
a network communication device configured to exchange data communications through a communication network, the communication network including at least one database accessible to the network communication device;
a processor coupled to the network communication device;
a storage device accessible to the processor; and
an application program in the storage device, the application program including a plurality of functions of a web application, wherein execution of the application program by the processor configures the processor as an application server to exchange data communications related to the plurality of functions with one or more client devices through the communication network,
wherein the processor is configured to perform functions, including functions to:
receive, from an originating device of a caller, a call request for a voice call to a recipient mobile device through a mobile communication network, the call request including a mobile device identifier associated with the originating mobile device;
responsive to the received call request, transmit image data to the recipient mobile device via a data channel of the mobile communication network based on the mobile device identifier associated with the originating mobile device, wherein the image data being transmitted is to be displayed as part of an incoming call notification at the recipient mobile device, and the image data is at least one of:
a caller-specific image associated with the caller; or
a default image related to a subscriber account associated with the originating device in the mobile communication network; and
allow the voice call from the originating device to proceed to the recipient mobile device via a voice channel of the mobile communication network, only after the image data is transmitted to the recipient mobile device or a predetermined time period has elapsed after the call request has been received.

13. The system of claim 12, wherein the recipient mobile device is configured to receive voice calls and data through separate voice and data channels of the mobile communication network and the voice channel of the mobile communication network includes a first type of radio access network for voice calls and the data channel of the mobile communication network includes a second type of radio access network for data.

14. The system of claim 13, wherein the first type of radio access network is a circuit-switched network for mobile voice communications and the second type of radio access network is a packet-switched network for mobile data communications.

15. The system of claim 14, wherein the first type of radio access network is a Code Division Multiple Access ("CDMA") network and the second type of radio access network is a Long Term Evolution ("LTE") network.

16. The system of claim 12, wherein the processor is further configured to perform functions to:
responsive to a registration request received from the recipient mobile device via the mobile communication network, store an Internet Protocol (IP) address of the recipient mobile device in association with subscriber account information previously stored for the recipient mobile device within the database;

establish a network data pathway to the recipient mobile device based on the stored IP address of the recipient mobile device;

transmit, to the recipient mobile device via the established network data pathway, a network address associated with either the caller-specific image or the default image, depending on a determination of whether or not the caller-specific image is stored in the database; and receive, from the recipient mobile device via the network data pathway, a fetch request including the transmitted network address, send the caller-specific image or the default image corresponding to the network address, wherein the storing and establishing functions are performed prior to the receipt of the call request from the originating device.

17. The system of claim 16, wherein the processor is further configured to perform a function to:

maintain the established network data pathway in an active state in response to signals periodically received from the recipient mobile device.

18. The system of claim 16, wherein the registration request includes the caller-specific image and the caller-specific image is stored in association with the subscriber account information for the recipient mobile device.

19. The system of claim 16, wherein the call request from the originating device further includes a mobile device identifier of the originating device, the stored subscriber account information for the originating device includes a plurality of caller-specific images, and the transmit function includes a function to:

select one of the plurality of call-specific images for transmission to the recipient mobile device based on the mobile identifier associated with the recipient mobile device.

20. An article of manufacture, comprising a non-transitory computer-readable medium and computer-executable instructions embodied in the medium that, if executed by a computing device, cause the computing device to perform functions, comprising:

receiving, at a mobile device via a network data pathway to a server of a mobile communication network, a network address associated with a caller-specific image for a voice call from a caller;

responsive to the received network address, sending a fetch request for the caller-specific image to the server via the network data pathway, the fetch request including the transmitted network address associated with the caller-specific image;

receiving the caller-specific image from the server via the data pathway based on the fetch request; and upon receiving signaling for the voice call from the mobile communication network, displaying via a display of the mobile device the caller-specific image as part of an incoming call notification for a user of the mobile device.

21. A method comprising steps of:

receiving, from an originating device of a caller, a call request for a voice call to a recipient mobile device through a mobile communication network, the call request including a mobile device identifier associated with the recipient mobile device;

responsive to the received call request, transmitting an image request to provide to the recipient mobile device through a different communication channel than the voice call, to be displayed as part of an incoming call notification at the recipient mobile device, at least one of:

if available, a caller-specific image for the caller at the originating device, or independent of whether or not the caller-specific image is available, a default image related to a subscriber account associated with the originating device in the mobile communication network;

responsive to transmitting the image request, determining whether a response has been received, the response indicating that at least one of the caller-specific or default images was provided to the recipient mobile device or a predetermined time period has elapsed without having provided the at least one of the caller-specific or default images to the recipient mobile device; and allowing the voice call from the originating device to proceed to the recipient mobile device via the mobile communication network responsive to determining, within a predetermined time period after having received, the call request the earlier of whether the response has been received or the predetermined time period has elapsed.

* * * * *